(12) United States Patent
Tanaka

(10) Patent No.: US 8,948,615 B2
(45) Date of Patent: Feb. 3, 2015

(54) OPTICAL RECEIVER AND COMMUNICATION SYSTEM

(75) Inventor: Hiromasa Tanaka, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 870 days.

(21) Appl. No.: 13/074,184

(22) Filed: Mar. 29, 2011

(65) Prior Publication Data

US 2011/0243572 A1 Oct. 6, 2011

(30) Foreign Application Priority Data

Mar. 31, 2010 (JP) ................................. 2010-082415

(51) Int. Cl.
*H04B 10/06* (2006.01)
*H04B 10/67* (2013.01)
*H04B 10/00* (2013.01)

(52) U.S. Cl.
CPC .................................. *H04B 10/672* (2013.01)
USPC .............................. 398/213; 398/38; 398/212

(58) Field of Classification Search
CPC ............................................... H04B 10/07955
USPC ........... 398/38, 202, 205, 206, 207, 208, 209, 398/212, 213
See application file for complete search history.

(56) References Cited

U.S. PATENT DOCUMENTS

| | | | |
|---|---|---|---|
| 6,204,951 B1 * | 3/2001 | Coward et al. | 359/245 |
| 2007/0223931 A1 * | 9/2007 | Uchikata | 398/147 |
| 2008/0094692 A1 | 4/2008 | Yoshida | |

FOREIGN PATENT DOCUMENTS

JP 2006-203179 8/2006

OTHER PUBLICATIONS

Dutton, Harry J. R., "Understanding Optical Communications", Sep. 1998, IBM Corporation, International Technical Support Organization, First Edition, p. 215.*

* cited by examiner

*Primary Examiner* — Daniel Dobson
(74) *Attorney, Agent, or Firm* — Staas & Halsey LLP

(57) ABSTRACT

There is provided an optical receiver including a variable-ratio splitter to split an input signal light into a plurality of signal lights, based on a variable ratio, a plurality of photo detectors to receive the plurality of signal lights respectively, an operation circuit to output a reception electrical signal, based on a reception processing on one of the plurality of signal lights, a calculation circuit to calculate a total power of the plurality of signal lights received by the plurality of photo detectors, and an output unit to output a signal regarding the total power.

17 Claims, 18 Drawing Sheets

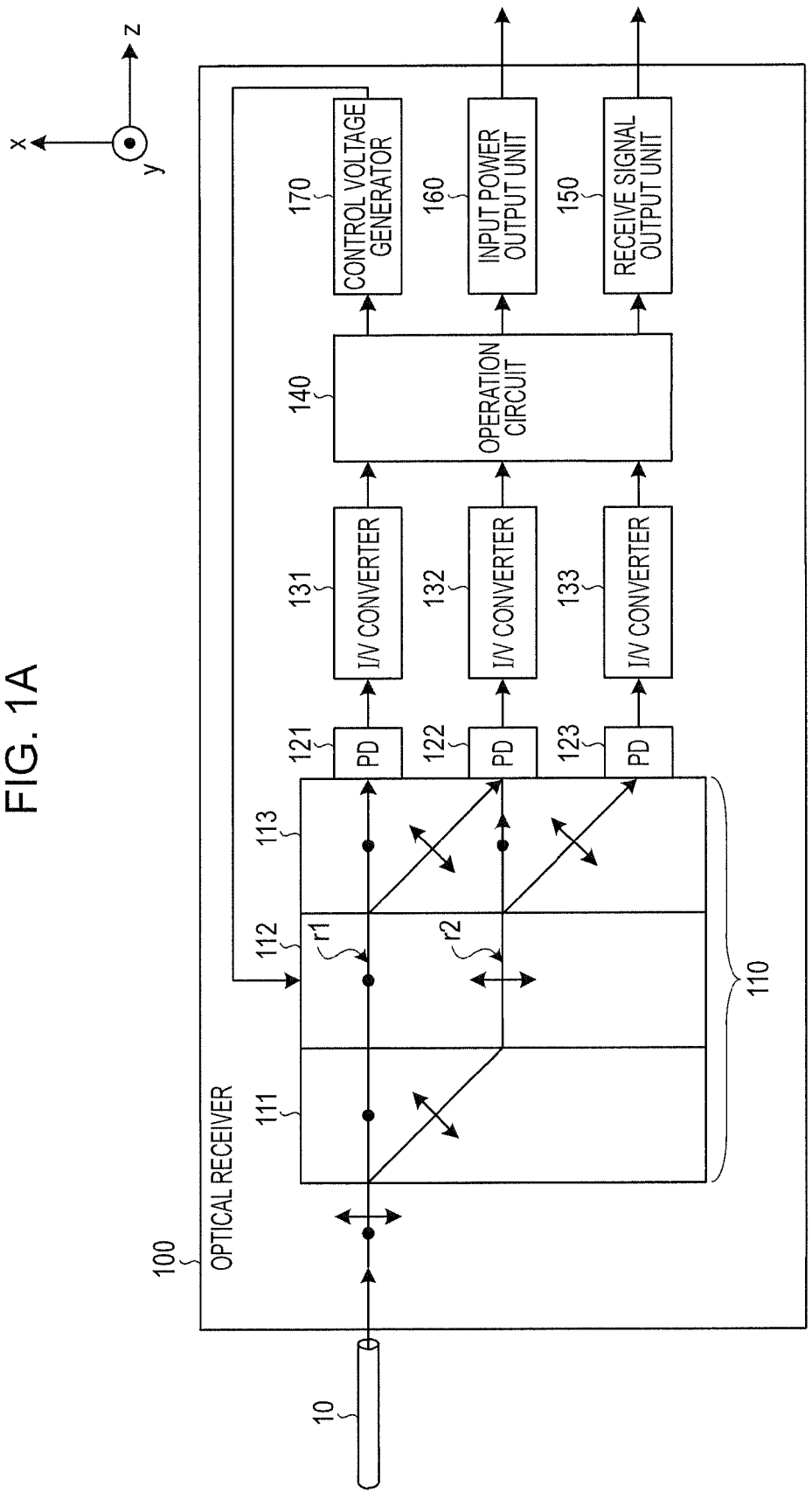

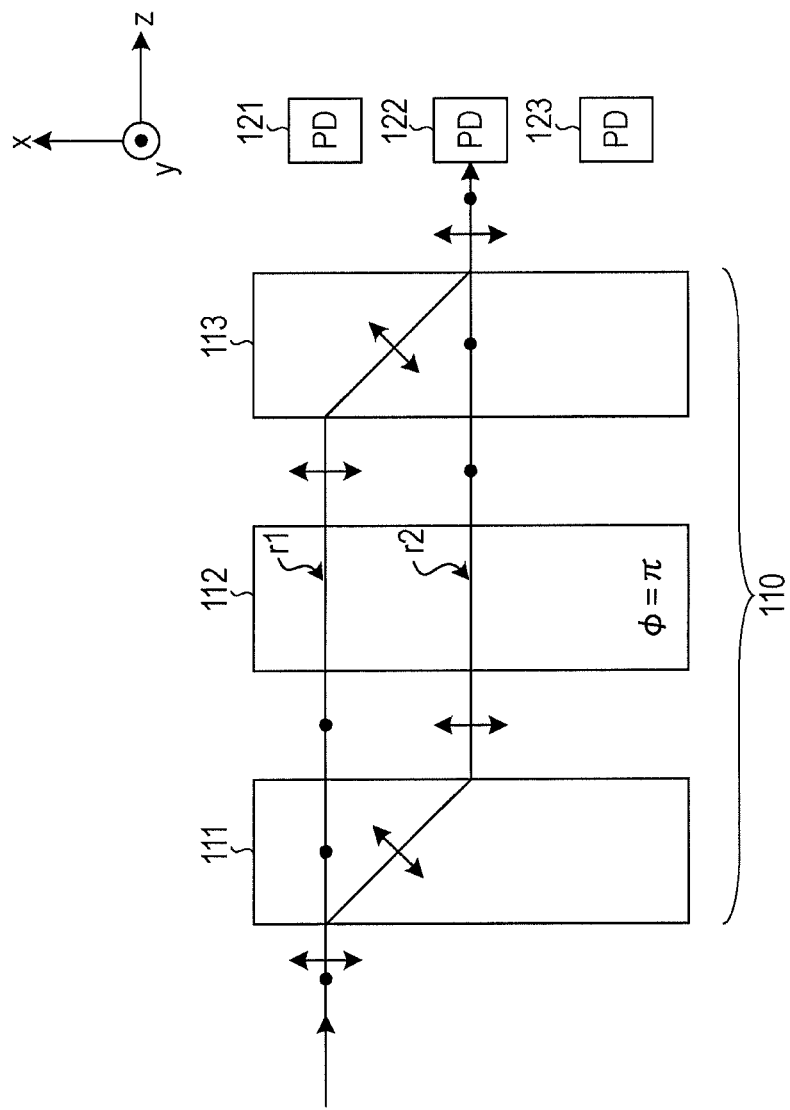

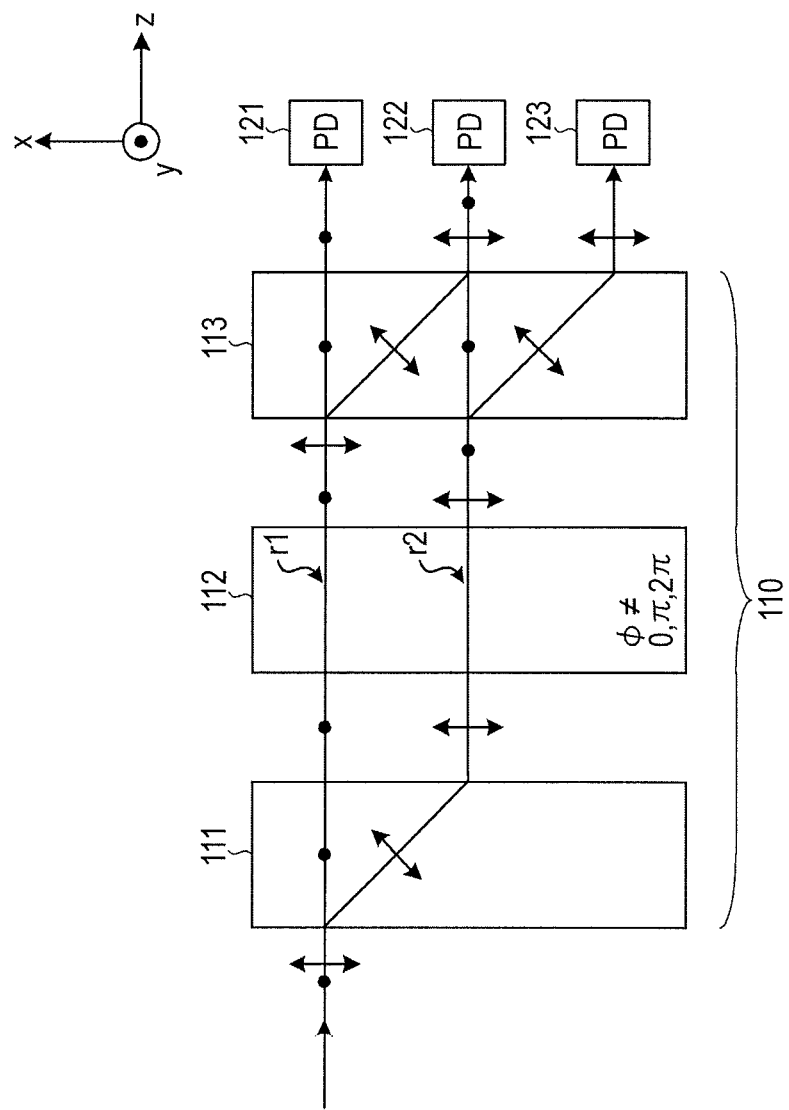

FIG. 8

| INPUT POWER | POWER OF MAIN SIGNAL | AMOUNT OF ATTENUATION |
|---|---|---|
| −28[dBm] | −28[dBm] | 0[dBm] |
| ... | ... | ... |
| −20[dBm] | −20[dBm] | 0[dBm] |
| ... | ... | ... |
| −10[dBm] | −10[dBm] | 0[dBm] |
| ... | ... | ... |
| −7[dBm] | −10[dBm] | 3[dBm] |
| ... | ... | ... |
| 0[dBm] | −10[dBm] | 10[dBm] |

800

OPTICAL RECEIVER AND COMMUNICATION SYSTEM

CROSS-REFERENCE TO RELATED APPLICATION

This application is based upon and claims the benefit of priority of the prior Japanese Patent Application No. 2010-082415, filed on Mar. 31, 2010, the entire contents of which are incorporated herein by reference.

FIELD

The embodiments discussed herein are related to an optical receiver and a communication system which includes the optical receiver.

BACKGROUND

When the signal light input to an optical receiving module applied in an optical communication system has large power, a large amplitude signal is input to a receiving circuit after a light receiving element such as an Avalanche Photo Diode (APD). As a result, the duty variation due to the amplitude saturation may deteriorate the received signal characteristic. In a long distance optical communication, since many optical amplifier may be provided at some points of an optical transmission line, a wide optical power range (dynamic range) is requested which can be received by an optical receiving module. On the other hand, for example, a technology has been known which has a variable optical attenuator before an internal light receiving element of an optical receiving module and attenuates signal light when input signal light has large power.

In recent years, an input-power monitoring function which monitors the input power of a signal light to an optical receiving module may be requested in an optical receiving module. (Refer to Japanese Laid-open Patent Publication No. 2006-203179, for example). The input-power monitoring may be required to indicate the input power of a signal light before attenuated by a variable optical attenuator even while the signal light is being attenuated. On the other hand, for example, a technology has been known in which an optical coupler before the variable optical attenuator partially splits signal light, and the split signal light is monitored for implementing the input power monitoring.

However, the technology in the past may not monitor input power with high precision. For example, a branch ratio of an optical coupler may depend on the wavelength of signal light or temperature. Thus, the technology in which signal light is partially split by an optical coupler before a variable optical attenuator for monitoring may provide input-power monitoring results which vary in accordance with the changes in branch ratio of the optical coupler even for constant input power of signal light.

On the other hand, a look-up table may be created for wavelengths or temperatures in advance, and split signal light and the look-up table may be used to estimate the input power. However, creating a look-up table with high precision for correcting monitoring result variations due to the wavelength or temperatures may require many experiments and/or simulations, for example, which may increase the manufacturing costs for the optical receiving module.

The technology which partially splits and monitors signal light with an optical coupler before a variable optical attenuator may unconditionally split a part of signal light, which may cause signal light loss. Therefore, when signal light has small input power, the minimum receiving sensitivity may deteriorate.

SUMMARY

According to an aspect of the embodiment, there is provided an optical receiver including a variable-ratio splitter to split an input signal light into a plurality of signal lights, based on a variable ratio, a plurality of photo detectors to receive the plurality of signal lights respectively, an operation circuit to output a reception electrical signal, based on a reception processing on one of the plurality of signal lights, a calculation circuit to calculate a total power of the plurality of signal lights received by the plurality of photo detectors, and an output unit to output a signal regarding the total power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A illustrates a first configuration example of an optical receiver;

FIG. 2A illustrates optical paths of signal light in variable-ratio splitter ($\phi=\pi$);

FIG. 2C illustrates an optical path for signal light in a variable-ratio splitter ($\phi \neq 0$, $\pi$, or $2\pi$);

FIG. 8 illustrates an example of changing the amount of attenuation by the switching processing in a control operation;

DESCRIPTION OF EMBODIMENTS

Figure 1B:
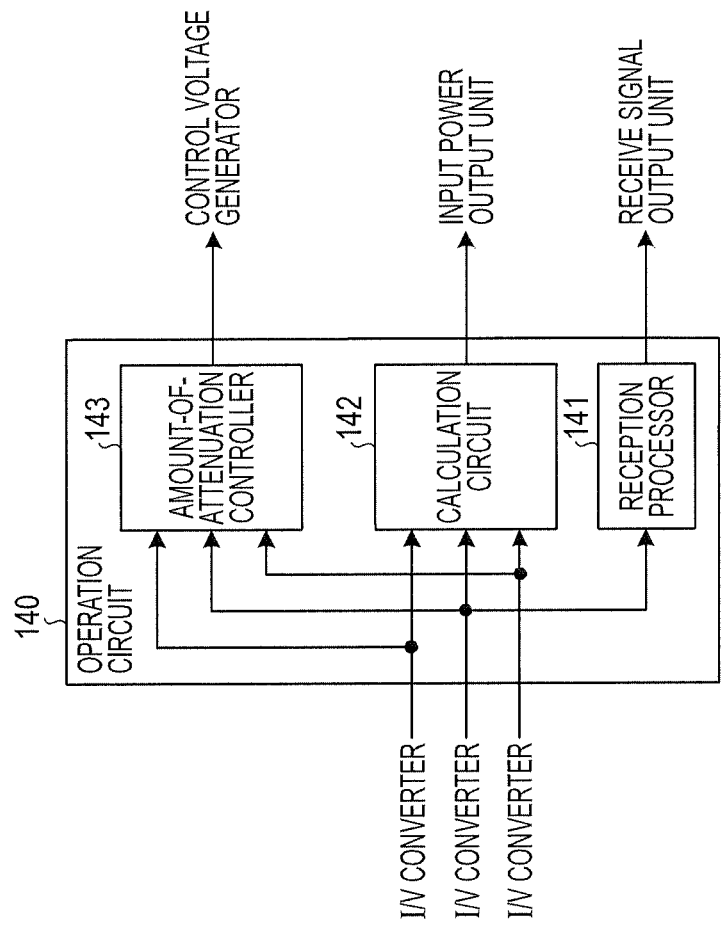
FIG. 1B illustrates a first configuration example of an operation circuit.

With reference to the drawings, preferred embodiments of the disclosed technology will be described in detail. In the disclosed technology, signal light is split on the basis of a variable ratio, and the split signal light is received. Thus, the power of the received signal light can be attenuated, and the total power of the received signal light can be calculated so that the input power before the signal light is attenuated may be monitored with high precision.

First Embodiment

FIG. 1A illustrates a first configuration example of an optical receiver. An optical receiver 100 receives signal light transmitted from an optical transmitter through an optical fiber 10. The optical receiver 100 includes a variable-ratio splitter 110, photo detectors (PDs) 121 to 123, I/V converters 131 to 133, an operation circuit 140, a receive signal output unit 150, an input power output unit 160, and a control voltage generator 170.

On FIG. 1A, the double arrows on arrows indicating signal light indicate that the signal light contains an x-polarized component (horizontal polarized component). The dots on the arrows indicating signal light indicate that the signal light contains a y-polarized component (perpendicular polarized component). The y-polarized component and x-polarized component may be polarized components which are orthogonal to each other, for example. The signal light output from the optical fiber 10 contains the y-polarized component and x-polarized component.

The variable-ratio splitter 110 splits signal light output from the optical fiber 10 on the basis of a variable ratio (power ratio). The variable-ratio splitter 110 splits signal light into three beams in accordance with the control voltage output from the control voltage generator 170. The variable-ratio splitter 110 outputs partial signal light of the split signal light beams as a main signal to the PD 122. This allows the variable-ratio splitter 110 to attenuate the signal light input from the optical fiber 10 by a variable amount of attenuation and cause the PD 122 to receive the resulting light. The variable-ratio splitter 110 outputs another signal light of the split signal light beams as a monitor signal to the PDs 121 and 123.

More specifically, the variable-ratio splitter 110 includes a polarizer 111, a variable phase plate 112, and a polarizer 113. The polarizer 111 (second polarizer) outputs the signal light output from the optical fiber 10 through an optical path which is different for each polarized component. More specifically, the polarizer 111 outputs the y-polarized component contained in the signal light output from the optical fiber 10 through an optical path r1 to the variable phase plate 112. The polarizer 111 outputs the x-polarized component contained in the signal light output from the optical fiber 10 through an optical path r2 to the variable phase plate 112.

The variable phase plate 112 is a polarization adjusting unit which changes the ratio of polarized components contained in signal light in accordance with the control voltage to be applied. More specifically, the variable phase plate 112 causes the signal light on the optical paths r1 and r2 output from the polarizer 111 to pass through with an index of refraction which is different for each polarized component so as to give a phase difference between polarized components of signal light beams.

More specifically, the variable phase plate 112 gives the phase difference according to the control voltage to be applied from the control voltage generator 170 between the polarized components. This can change the direction of polarization of the signal light in accordance with the control voltage to be applied to the variable phase plate 112. The variable phase plate 112 outputs signal light on the optical paths r1 and r2 in the changed directions of polarization to the polarizer 113.

The polarizer 113 (first polarizer) splits a polarized component contained in a signal light. More specifically, the polarizer 113 outputs the signal light beams output from the variable phase plate 112 through an optical path which is different for each polarized component. More specifically, the polarizer 113 outputs the y-polarized component contained in the signal light on the optical path r1 to the PD 121. The polarizer 113 outputs the x-polarized component contained in the signal light on the optical path r1 to the PD 122. The polarizer 113 outputs the y-polarized component contained in the signal light on the optical path r2 to the PD 122. The polarizer 113 outputs the x-polarized component contained in the signal light on the optical path r2 to the PD 123.

The polarizer 111 and polarizer 113 may be implemented by a birefringent plate and/or a polarization beam splitter, for example. The variable phase plate 112 may be implemented by an element having an electro-optical effect, an element having a magneto-optical effect, or a liquid crystal element which changes the index of refraction in accordance with the applied control voltage, for example.

For example, when the variable phase plate 112 is an element of LN crystal (lithium niobate crystal) having an electro-optical effect, the control voltage applied to the LN crystal induces the change of the index of refraction, which allows periodical change of the phase difference $\phi$ from 0 to $2\pi$ between orthogonal polarized component. The polarizer 111, variable phase plate 112 and polarizer 113 may be adjacent and integral to each other or may be provided with some spaces between them.

In this way, the variable-ratio splitter 110 changes the direction of polarization of signal light by changed index of refraction, and splits the signal light having the changed directions of polarization on the basis of the polarized components. Thus, for example, compared with the configuration in which light absorption may be used to change the direction of polarization, signal light may be split with minimum signal light loss to branch the signal light. Thus, the total power of signal light split by the variable-ratio splitter 110 may be substantially equal to the power (input power) of the signal light input to the optical receiver 100.

The polarized signal light beams split by the polarizer 111 are input to the variable phase plate 112. Thus, independent of the polarized state of the signal light input to the optical receiver 100, the direction of polarization of signal light on the variable phase plate 112 can be changed. It is assumed here that the optical axial direction of the variable phase plate 112 is the direction resulting from the synthesis of a Y-axis direction and an X-axis direction. In other words, the optical axial direction of the variable phase plate 112 tilts 45 degrees from the Y-axis direction to the X-axis direction.

The PDs 121 to 123 are provided at positions where signal light output from the variable branches 110 can be received. The PDs 121 to 123 perform photoelectric conversion on the received signal light and output them to the I/V converters 131 to 133. The I/V converters 131 to 133 convert the current of signals output from the PDs 121 to 123 to voltage. The I/V converters 131 to 133 output the signals converted to voltage to the operation circuit 140. The operation circuit 140 performs operations based on the signals output from the I/V converters 131 to 133.

FIG. 1B illustrates a first configuration example of the operation circuit. As illustrated in FIG. 1B, the operation circuit 140 includes a reception processor 141, a calculation circuit 142, and an amount-of-attenuation controller 143. The reception processor 141 performs reception processing on a signal (main signal) output from the I/V converter 132. The reception processing by the reception processor 141 may include identification of signals. The reception processor 141 outputs the result of the reception processing as a receive signal to the receive signal output unit 150.

The calculation circuit 142 calculates the total power of signals output from the I/V converters 131 to 133. The total power of signals output from the I/V converters 131 to 133 corresponds to the power (input power) before attenuated by the variable-ratio splitter 110 of the signal light input from the optical fiber 10 to the optical receiver 100. The calculation circuit 142 outputs the calculated total power to the input power output unit 160 as the input power to the optical receiver 100.

The amount-of-attenuation controller 143 controls the amount of attenuation on the main signal received by the PD 122 on the basis of at least one of the signals output from the I/V converters 131 to 133. More specifically, the amount-of-attenuation controller 143 outputs the voltage signal corresponding to control voltage applied to the variable phase plate 112 to the control voltage generator 170.

Referring back to FIG. 1A, the receive signal output unit 150 outputs the receive signal which is output from the operation circuit 140. The input power output unit 160 outputs the total power (input power) calculated by the operation circuit 140. The input power which is output unit 160 may include a user interface which notifies a user of input power. For example, the input power output unit 160 may include a monitor which displays input power or a monitor controller which causes a monitor to display input power.

The input power output unit 160 may include a speaker which audibly outputs input power or a speaker controller which causes a speaker to audibly output input power. The input power output unit 160 may include a printer which prints input power or a printer controller which causes a printer to print input power. The input power output unit 160 may include a communication interface which transmits input power to a different communication apparatus.

The control voltage generator 170 generates voltage corresponding to a voltage signal output from the operation circuit 140 as control voltage and applies the generated control voltage to the variable phase plate 112. For example, the control voltage generator 170 may include a digital/analog converter (DAC) which converts a digital voltage signal output from the operation circuit 140 to an analog signal. The control voltage generator 170 applies the voltage signal converted to an analog signal as the control voltage to the variable phase plate 112.

Figure 2B:
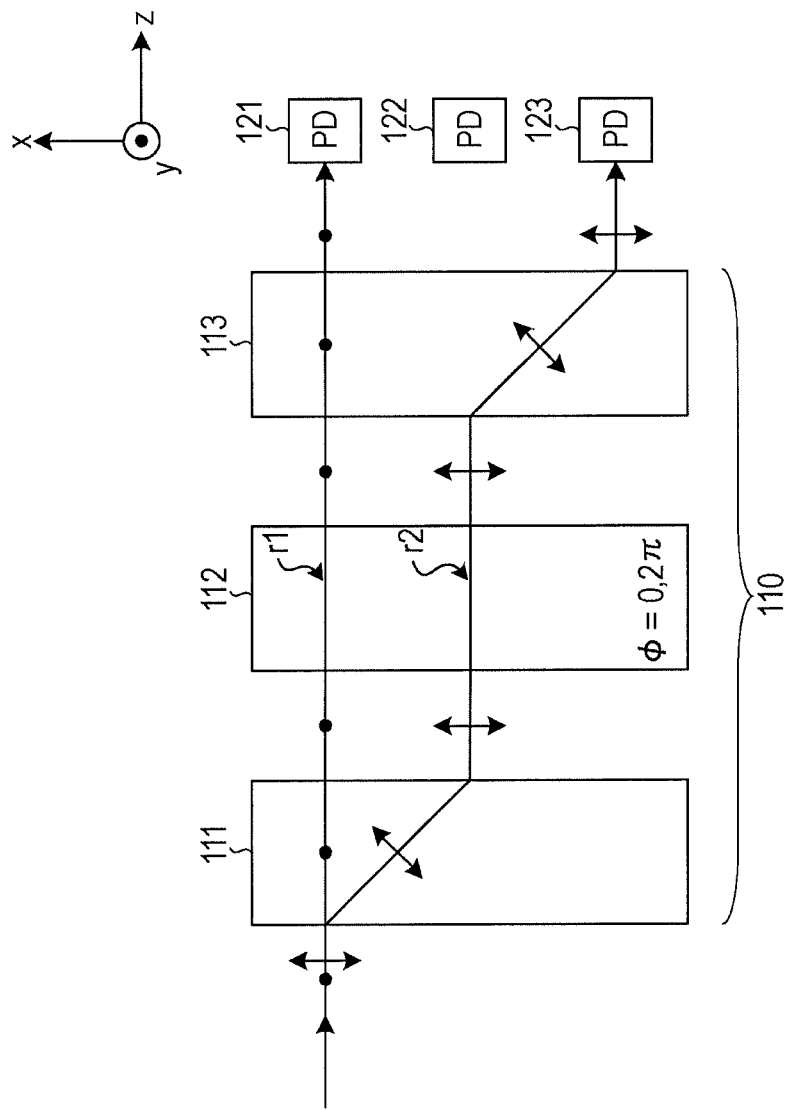
FIG. 2B illustrates an optical path of signal light in a variable-ratio splitter ($\phi=0$ or $2\pi$)

FIG. 2A illustrates optical paths for signal light in the variable-ratio splitter ($\phi=\pi$). FIG. 2A to FIG. 2C illustrate the polarizer 111, variable phase plate 112, polarizer 113 and PDs 121 to 123 among the components of the optical receiver 100. In FIG. 2A to FIG. 2C, the polarizer 111, variable phase plate 112, polarizer 113 and PDs 121 to 123 are provided with spaces between them.

When the phase difference $\phi$ given between the polarized components which are orthogonal in the variable phase plate 112 is $\pi$, as illustrated in FIG. 2A, the signal light of the y-polarized light input from the polarizer 111 through the optical path r1 to the variable phase plate 112 becomes x-polarized light which then is input to the polarizer 113. Then, the signal light of the x-polarized light input from the variable phase plate 112 to the polarizer 113 is output to the PD 122.

The signal light of the x-polarized light input from the polarizer 111 through the optical path r2 to the variable phase plate 112 becomes y-polarized light which then is input to the polarizer 113. The signal light of the y-polarized light input from the variable phase plate 112 to the polarizer 113 is output to the PD 122. Thus, when the phase difference $\phi$ is $\pi$ in the variable phase plate 112, the split signal light beams are received by the PD 122. In this case, no signal light is received by the PDs 121 and 123. Therefore, the amount of attenuation on the main signal received by the PD 122 is equal to a minimum (0).

In this way, the variable-ratio splitter 110 in a specific state ($\phi=\pi$) causes all of signal light input from the optical fiber 10 to be received by the PD 122 (predetermined light receiving portion). The reception processor 141 then performs reception processing on the signal light received by the PD 122 as a main signal. This allows the amount of attenuation on the main signal which undergoes the reception processing by the reception processor 141 to be equal to 0 by changing the variable-ratio splitter 110 to the specific state ($\phi=\pi$). Thus, even when the signal light has low input power, the deterioration of the minimum receiving sensitivity can be prevented.

FIG. 2B illustrates an optical path for signal light in a variable branch ($\phi=0$ or $2\pi$). When the phase difference $\phi$ given between the polarized components which are orthogonal in the variable phase plate 112 is equal to 0 or $2\pi$, as illustrated in FIG. 2B, the signal light input from the polarizer 111 through the optical path r1 to the variable phase plate 112 is input as y-polarized light to the polarizer 113. The signal light of the y-polarized light input from the variable phase plate 112 to the polarizer 113 is output to the PD 121.

The signal light input from the polarizer 111 through the optical path r2 to the variable phase plate 112 in input as x-polarized light to the polarizer 113. The signal light of the x-polarized light input from the variable phase plate 112 to the polarizer 113 is output to the PD 123. Thus, when the phase difference $\phi$ is 0 or $2\pi$ in the variable phase plate 112, the split signal light beams are received by the PD 121 and PD 123. In this case, no signal light is received by the PD 122. Thus, the amount of attenuation on a main signal received by the PD 122 becomes a maximum.

FIG. 2C illustrates an optical path for signal light in a variable-ratio splitter ($\phi \neq 0, \pi$, or $2\pi$). When the phase difference $\phi$ given between orthogonal polarized components in the signal light variable phase plate 112 is a value excluding 0, $\pi$, and $2\pi$, as illustrated in FIG. 2C, the signal light input from the polarizer 111 through the optical path r1 to the variable phase plate 112 contains the x-polarized component and the y-polarized component and is input to the polarizer 113. The ratio between the x-polarized component and the y-polarized component input to the polarizer 113 depends on the phase difference $\phi$. The y-polarized component input from the variable phase plate 112 through the optical path r1 to the polarizer 113 is output to the PD 121. The x-polarized component input from the variable phase plate 112 through the optical path r1 to the polarizer 113 is output to the PD 122.

The signal light input from the polarizer 111 through the optical path r2 to the variable phase plate 112 contains an x-polarized component and a y-polarized component and is input to the polarizer 113. The ratio between the x-polarized component and y-polarized component input to the polarizer 113 depends on the phase difference $\phi$. The y-polarized component input from the variable phase plate 112 through the optical path r2 to the polarizer 113 is output to the PD 122. The x-polarized component input from the variable phase plate 112 through the optical path r2 to the polarizer 113 is output to the PD 123. Thus, when the phase difference $\phi$ is a value excluding 0, $\pi$, and $2\pi$ in the variable phase plate 112, the split signal light beams are received by the PDs 121 to 123. Thus, the amount of attenuation on a main signal received by the PD 122 becomes equal to the amount of attenuation based on the phase difference φ.

Figure 3:
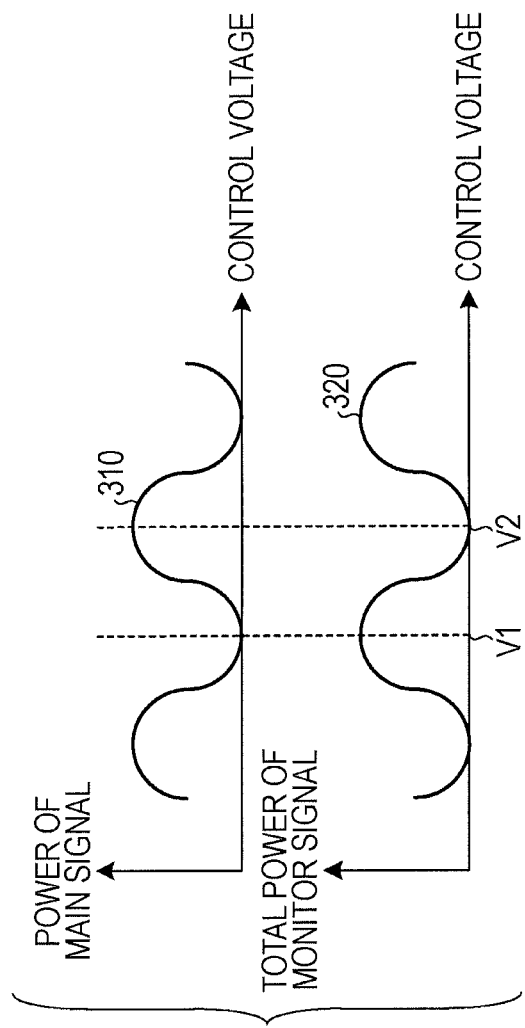
FIG. 3 is a graph illustrating changes in main signal and monitor signal corresponding to control voltage.

FIG. 3 is a graph illustrating changes in main signal and monitor signal corresponding to control voltage. In FIG. 3, the horizontal axis indicates the magnitude of control voltage to be applied to the variable phase plate 112. The vertical axis indicates the power of a main signal received by the PD 122, and PD 121 and 123 and total power of a monitor signal. A characteristic 310 indicates changes in power of a main signal corresponding to the control voltage. A characteristic 320 indicates changes in total power of a monitor signal corresponding to control voltage.

As exhibited by the characteristic 310, changing control voltage can change the power of a main signal periodically. Thus, the amount-of-attenuation controller 143 changes the control voltage to be applied to the variable phase plate 112 so that the power of the main signal output from the I/V converter 132 can be equal to a desirable value. Thus, the power (the amount of attenuation) of the main signal can be controlled. For example, when the control voltage to be applied to the variable phase plate 112 is equal to voltage V1, the power of the main signal becomes a minimum (while the amount of attenuation is a maximum). When the control voltage to be applied to the variable phase plate 112 is equal to voltage V2, the power of the main signal is equal to a maximum (while the amount of attenuation is equal to a minimum).

As exhibited by the characteristic 310 and characteristic 320, the sum of the power of the main signal corresponding to the control voltage and the total power of the monitor signal corresponding to the control voltage is constant. Thus, the amount-of-attenuation controller 143 may change the control voltage to be applied to the variable phase plate 112 so that the total power of the monitor signals to be output from the I/V converters 131 and 133 can be equal to desirable value. Thus, the power of the main signal (the amount of attenuation) can be controlled.

Figure 4:
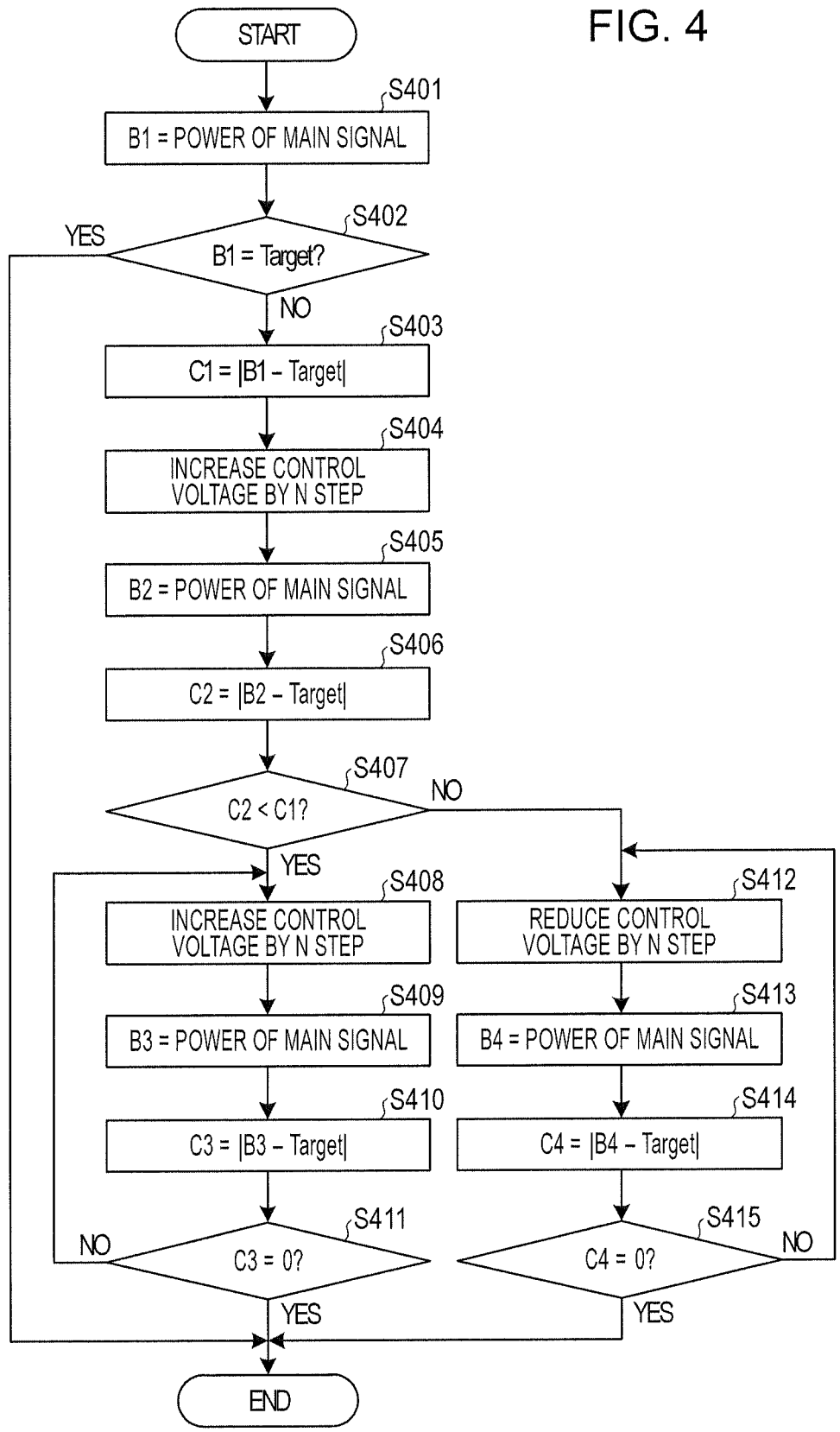
FIG. 4 is a flowchart illustrating an example of control for attenuating a main signal.

FIG. 4 is a flowchart illustrating an example of control for attenuating a main signal. As attenuation control for attenuating a main signal to be received by the PD 122, the amount-of-attenuation controller 143 in the operation circuit 140 performs the following steps, for example. It is assumed here that memory in the optical receiver 100 prestores target power Target of a main signal. First of all, the power of a signal (main signal) output from the I/V converter 132 is stored in a variable field B1 (step S401).

Next, whether the power stored in the variable B1 agrees with the target power Target or not is determined (step S402). If the power stored in the variable B1 agrees with the target power Target (Yes in step S402), the processing exits the series of operations. If not (No in step S402), the absolute value of the difference between the power stored in the variable B1 and target power Target is stored in a variable C1 (step S403).

Next, the control voltage to be applied to the variable phase plate 112 is increased by a unit amount N step (step S404). Next, the power of the signal (main signal) output from the I/V converter 132 is stored in a variable B2 (step S405). Next, the absolute value of the difference between the power stored in the variable B2 and the target power Target is stored in a variable C2 (step S406).

Next, whether the value stored in the variable C2 is smaller than the value stored in the variable C1 or not is determined (step S407). This allows the determination on whether the power of the main signal has approached to the target power Target by step S404 or not. If the value stored in the variable C2 is smaller than the value stored in the variable C1 (Yes in step S407), the control voltage to be applied to the variable phase plate 112 is increased by the unit amount N step (step S408).

Next, the power of a signal (main signal) output from the I/V converter 132 is stored in a variable B3 (step S409). Next, the absolute value of the difference between the power stored in the variable B3 and the target power Target is stored in a variable C3 (step S410). Next, whether the value stored in the variable C3 is equal to 0 or not is determined (step S411). If the value stored in the variable C3 is not equal to 0 (No in step S411), the processing returns to step S408. If the value stored in the variable C3 is equal to 0 (Yes in step S411), the processing exits the series of operations.

In step S407, if the value stored in the variable C2 is not smaller than the value stored in the variable C1 (No in step S407), the control voltage to be applied to the variable phase plate 112 is reduced by the unit amount N step (step S412). Next, the power of the signal (main signal) output from the I/V converter 132 is stored in a variable B4 (step S413).

Next, the absolute value of the difference between the power stored in the variable B4 and the target power Target is stored in the variable C4 (step S414). Next, whether the value stored in the variable C4 is equal to 0 or not is determined (step S415). If the value stored in the variable C4 is not equal to 0 (No in step S415), the processing returns to step S412. If the value stored in the variable C4 is equal to 0 (Yes in step S415), the processing exits the series of operations. The variables B1-B4 and C1-C4 are provided, for example, in memory of the optical receiver 100.

By repeating the steps above, the amount of attenuation on a main signal to be received by the PD 122 may be controlled so as to be equal to the target power Target. For example, if the power of a signal received by the PD 122 is equal to a desirable value (such as −10 [dBm]), the power of the signal output from the PD 122 may be prestored as a target power Target in memory of the optical receiver 100. Thus, the power of the signal received by the PD 122 can be equal to the desirable value (such as −10 [dBm]).

Figure 5:
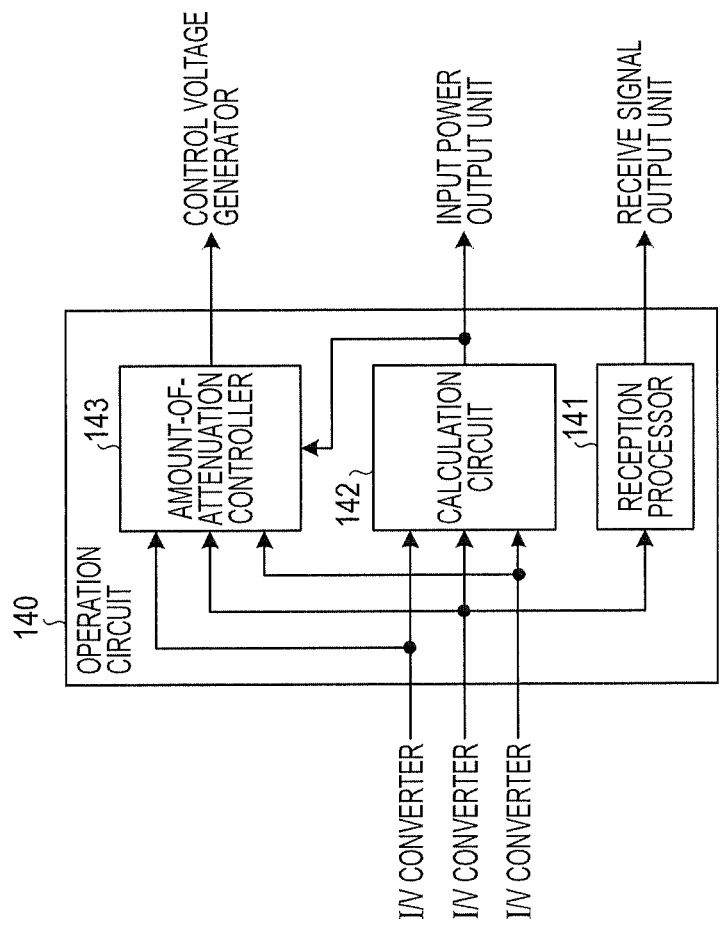
FIG. 5 illustrates a second configuration example of an operation circuit.

FIG. 5 illustrates a second configuration example of the operation circuit. In FIG. 5, like numbers refer to like components to those illustrated in FIG. 1B, and the description will be omitted. As illustrated in FIG. 5, the calculation circuit 142 in the operation circuit 140 may output the calculated input power to the input power output unit 160 and amount-of-attenuation controller 143. The amount-of-attenuation controller 143 changes the control operation over the amount of attenuation on the basis of the input power output from the calculation circuit 142. For example, the amount-of-attenuation controller 143 changes the control for attenuating the main signal as illustrated in FIG. 4 and control for minimizing the amount of attenuation on the main signal as illustrated in FIG. 6 on the basis of the input power.

Figure 6:
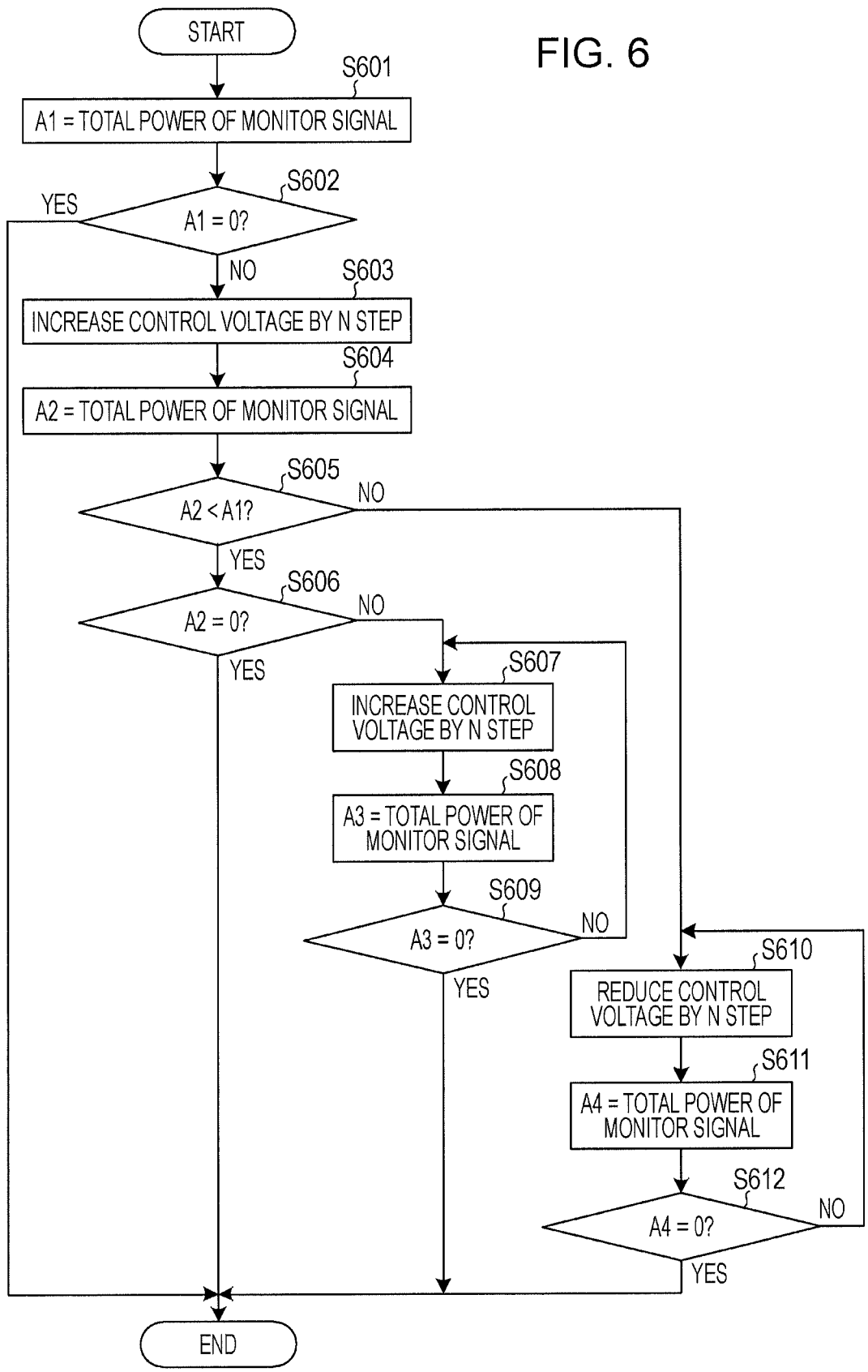
FIG. 6 is a flowchart of an example of control for minimizing the amount of attenuation on a main signal.

FIG. 6 is a flowchart of an example of control for minimizing the amount of attenuation on a main signal. In order to control for minimizing the amount of attenuation on a main signal, the amount-of-attenuation controller 143 in the operation circuit 140 performs the following steps. First of all, the total power of signals (monitor signals) output from the I/V converters 131 and 133 is stored in a variable A1 (step S601).

Next, whether the value stored in the variable A1 is equal to 0 or not is determined (step S602). If the value stored in the variable A1 is equal to 0 (Yes in step S602), the processing exits the series of operations. If the value stored in the variable A1 is not equal to 0 (No in step S602), the control voltage to be applied to the variable phase plate 112 is increased by a unit amount N step (step S603). Next, the total power of signals (monitor signals) output from the I/V converters 131 and 133 is stored in a variable A2 (step S604).

Whether the value stored in the variable A2 is smaller than the value stored in the variable A1 or not is determined next (step S605). This allows determination of whether the amount of attenuation of the main signal is reduced by step S603 or not. If the value stored in the variable A2 is smaller than the value stored in the variable A1 (Yes in step S605), whether the value stored in the variable A2 is equal to 0 or not is determined (step S606). If the value stored in the variable A2 is equal to 0 (Yes in step S606), the processing exits the series of operations.

In step S606, if the value stored in the variable A2 is not equal to 0 (No in step S606), the control voltage to be applied to the variable phase plate 112 is increased by the unit amount N step (step S607). Next, the total power of signals (monitor signals) output from the I/V converters 131 and 133 is stored in a variable A3 (step S608).

Whether the value stored in the variable A3 is equal to 0 or not is determined next (step S609). If the value stored in the variable A3 is not equal to 0 (No in step S609), the processing returns to step S607. If the value stored in the variable A3 is equal to 0 (Yes in step S609), the processing exits the series of operations.

In step S605, if the value stored in the variable A2 is not smaller than the value stored in the variable A1 (No in step S605), the control voltage to be applied to the variable phase plate 112 is reduced by the unit amount N step (step S610). Next, the total power of signals (monitor signals) output from the I/V converters 131 and 133 is stored in a variable A4 (step S611).

Then, whether the value stored in the variable A4 is equal to 0 or not is determined (step S612). If value stored in the variable A4 is not equal to 0 (No in step S612), the processing returns to step S610. If the value stored in the variable A4 is equal to 0 (Yes in step S612), the processing exits the series of operations. The variables A1-A4 are provided, for example, in memory of the optical receiver 100.

By repeating the steps above, the amount of attenuation by the variable-ratio splitter 110 on a main signal to be received by the PD 122 can be minimized (0 [dB]). Thus, even when the signal light from the optical fiber 10 to the optical receiver 100 has low input power, the deterioration of the minimum receiving sensitivity can be prevented.

Figure 7:
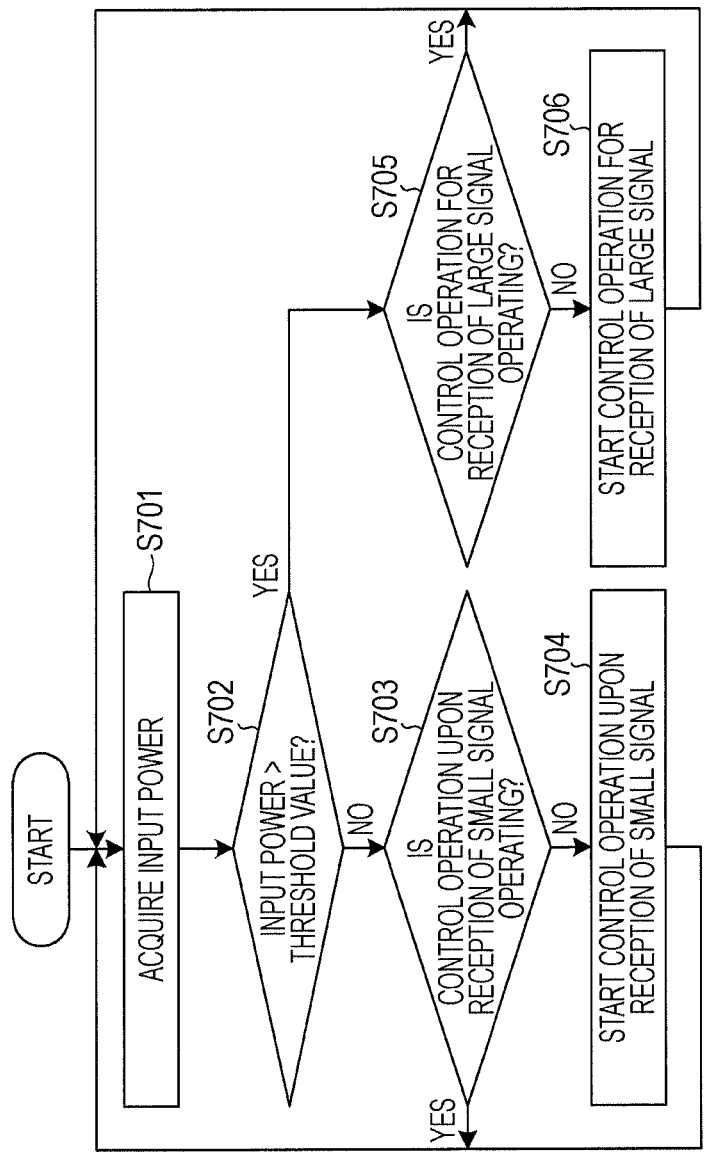
FIG. 7 is a flowchart describing an example of switching processing between control operations.

FIG. 7 is a flowchart describing an example of switching processing between control operations. As switching processing between control operations, the amount-of-attenuation controller 143 in the operation circuit 140 performs the following steps. First of all, the input power output from the calculation circuit 142 is acquired (step S701). Next, whether the input power acquired by step S701 is larger than a threshold value or not is determined (step S702).

If the input power is not larger than the threshold value in step S702 (No in step S702), whether a control operation for small signal input is being performed or not is determined (step S703). The control operation for small signal input may be control for minimizing the amount of attenuation as described in FIG. 6, for example. If the control operation for small signal input is being performed (Yes in step S703), the processing returns to step S701. If the control operation for small signal input is not being performed (No in step S703), the control operation for small signal input is started (step S704), and the processing returns to step S701.

If the input power is larger than the threshold value in step S702 (Yes in step S702), whether a control operation for large signal input is being performed or not is determined (step S705). The control operation for large signal input may be control for attenuating a main signal as described in FIG. 4, for example. If the control operation for large signal input is being performed (Yes in step S705), the processing returns to step S701. If the control operation for large signal input is not being performed (No in step S705), the control operation for large signal input is started (step S706), and the processing returns to step S701.

It is assumed here, for example, that the threshold value to be compared in step S702 is −10 [dBm]. In this case, if the input power to the optical receiver 100 is equal to or smaller than −10 [dBm], the amount-of-attenuation controller 143 performs the control for minimizing the amount of attenuation as described in FIG. 6 so that the deterioration of the minimum receiving sensitivity can be prevented. If the input power to the optical receiver 100 is larger than −10 [dBm], the amount-of-attenuation controller 143 performs the control for attenuating a main signal as described in FIG. 4 so that the main signal to be received by the PD 122 can be attenuated.

FIG. 8 illustrates an example of changing the amount of attenuation by the switching processing in the control operation. The table 800 in FIG. 8 illustrates attenuation results of the switching processing (where the threshold value is equal to −10 [dBm]) described in FIG. 7. More specifically, the table 800 illustrates the power of a main signal received by the PD 122 and the amount of attenuation of the main signal received by the PD 122 when the input power of signal light from the optical fiber 10 to the optical receiver 100 changes.

As illustrated in the table 800, when the input power is equal to or smaller than −10 [dBm], the control for minimizing the amount of attenuation as described in FIG. 6 changes the amount of attenuation of the main signal received by the PD 122 to 0 [dB]. When the input power is larger than −10 [dBm], the control for attenuating a main signal as described in FIG. 4 changes the power of the main signal received by the PD 122 to −10 [dBm] (target power Target).

Second Embodiment

Figure 9:
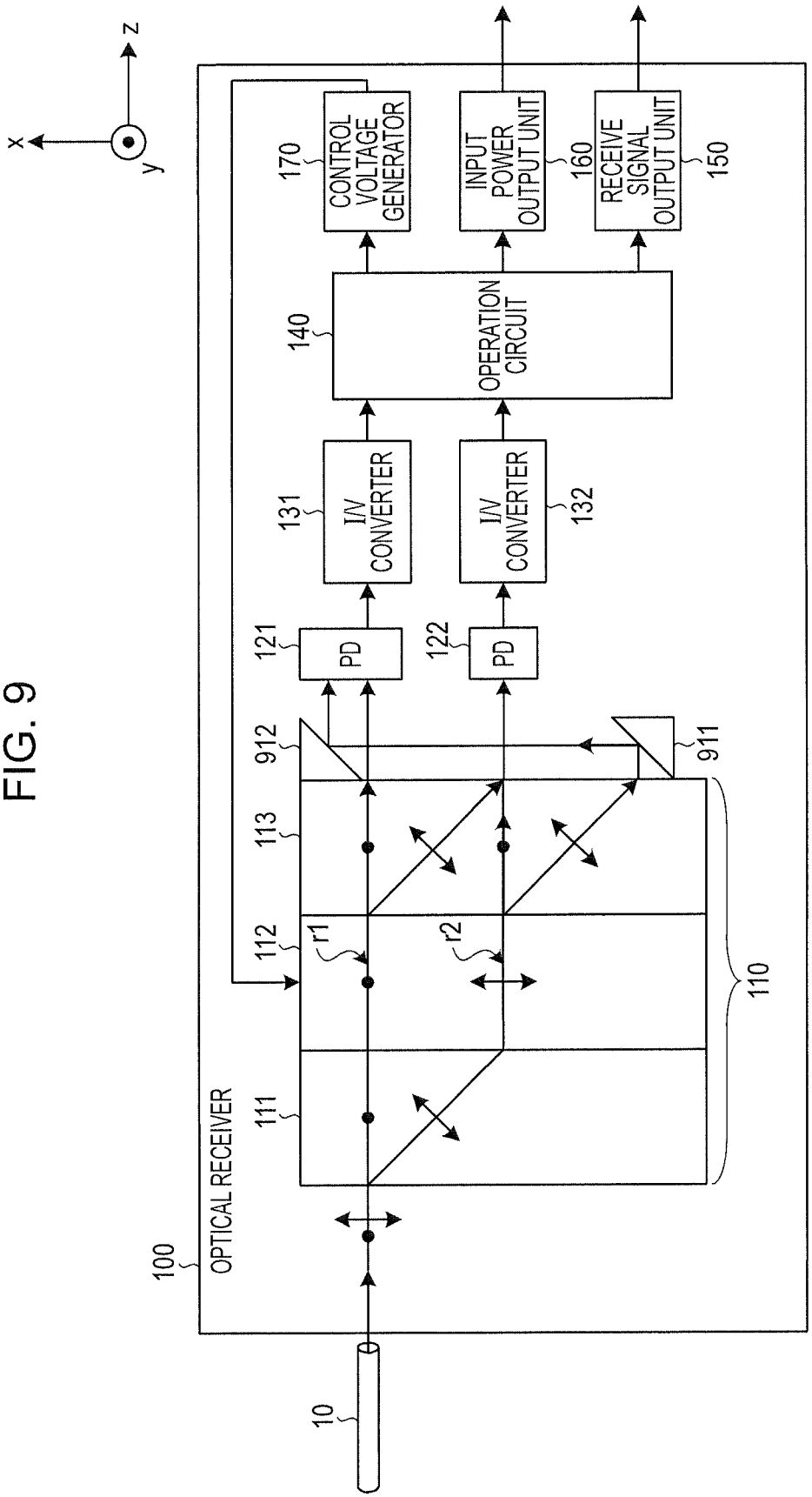
FIG. 9 illustrates a second configuration example of an optical receiver.

FIG. 9 illustrates a second configuration example of a optical receiver. In FIG. 9, like numbers refer to like components to those illustrated in FIG. 1A, and the description will be omitted. As illustrated in FIG. 9, the optical receiver 100 may include a reflector 911 and a reflector 912 in addition to the components illustrated in FIG. 1A. In this case, the PD 123 and I/V converter 133 illustrated in FIG. 1A may be omitted.

The polarizer 113 outputs an x-polarized component contained in signal light on the optical path r2 to the reflector 911. The reflector 911 reflects the signal light output from the polarizer 113 to the reflector 912. The reflector 912 reflects the signal light output from the reflector 911 to the PD 121. The PD 121 receives the signal light output from the polarizer 113 and the signal light output from the reflector 912.

Thus, the PD 121 receives a plurality of signal light beams which are different from the signal light which undergoes reception processing by the reception processor 141 among signal light beams split by the variable-ratio splitter 110. Even without the PD 123 and I/V converter 133 (as in FIG. 1A), the signal light beams split by the variable-ratio splitter 110 can be received. This may reduce the element number for control and the power consumption.

Third Embodiment

Figure 10:
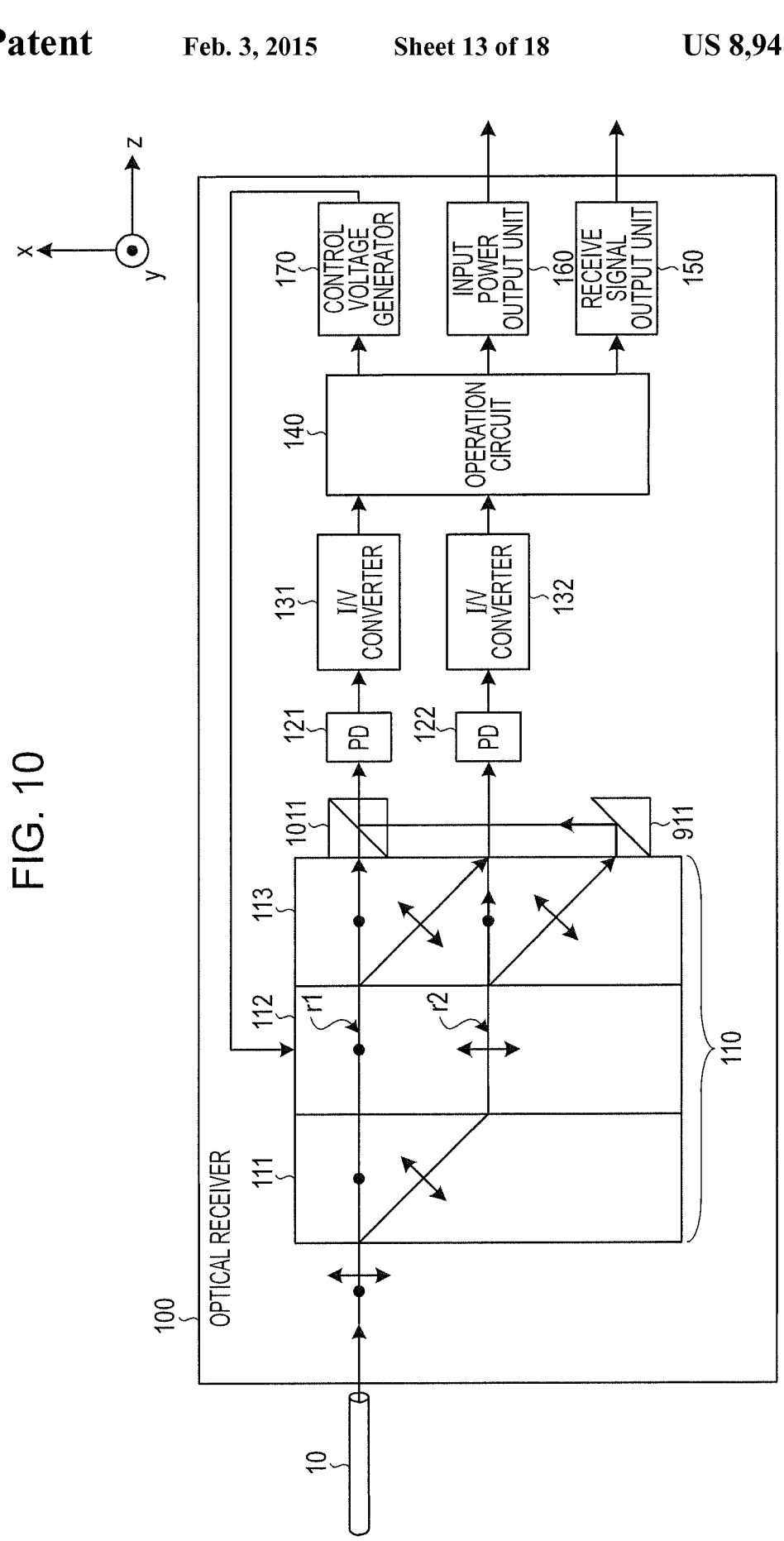
FIG. 10 illustrates a third configuration example of an optical receiver.

FIG. 10 illustrates a third configuration example of a optical receiver. In FIG. 10, like numbers refer to like components to those illustrated in FIG. 9, and the description will be omitted. As illustrated in FIG. 10, the optical receiver 100 may include a beam splitter 1011 in the configuration illustrated in FIG. 9 instead of the reflector 912.

The polarizer 113 outputs a y-polarized component contained in signal light on the optical path r1 to the beam splitter 1011. The reflector 911 outputs the signal light output from the polarizer 113 to the beam splitter 1011. The beam splitter 1011 multiplexes the signal light from the polarizer 113 and the signal light from the reflector 911 and outputs the multiplexed signal light to the PD 121. The PD 121 receives the multiplexed signal light output from the beam splitter 1011.

In this way, the PD 121 receives a plurality of signal light beams which are different from the signal light which undergoes reception processing by the reception processor 141 among signal light beams split by the variable-ratio splitter 110. Thus, even without the PD 123 and I/V converter 133 (as in FIG. 1A), the signal light beams split by the variable-ratio splitter 110 can be received. This may reduce the element number for control and the power consumption.

Fourth Embodiment

Figure 11A:
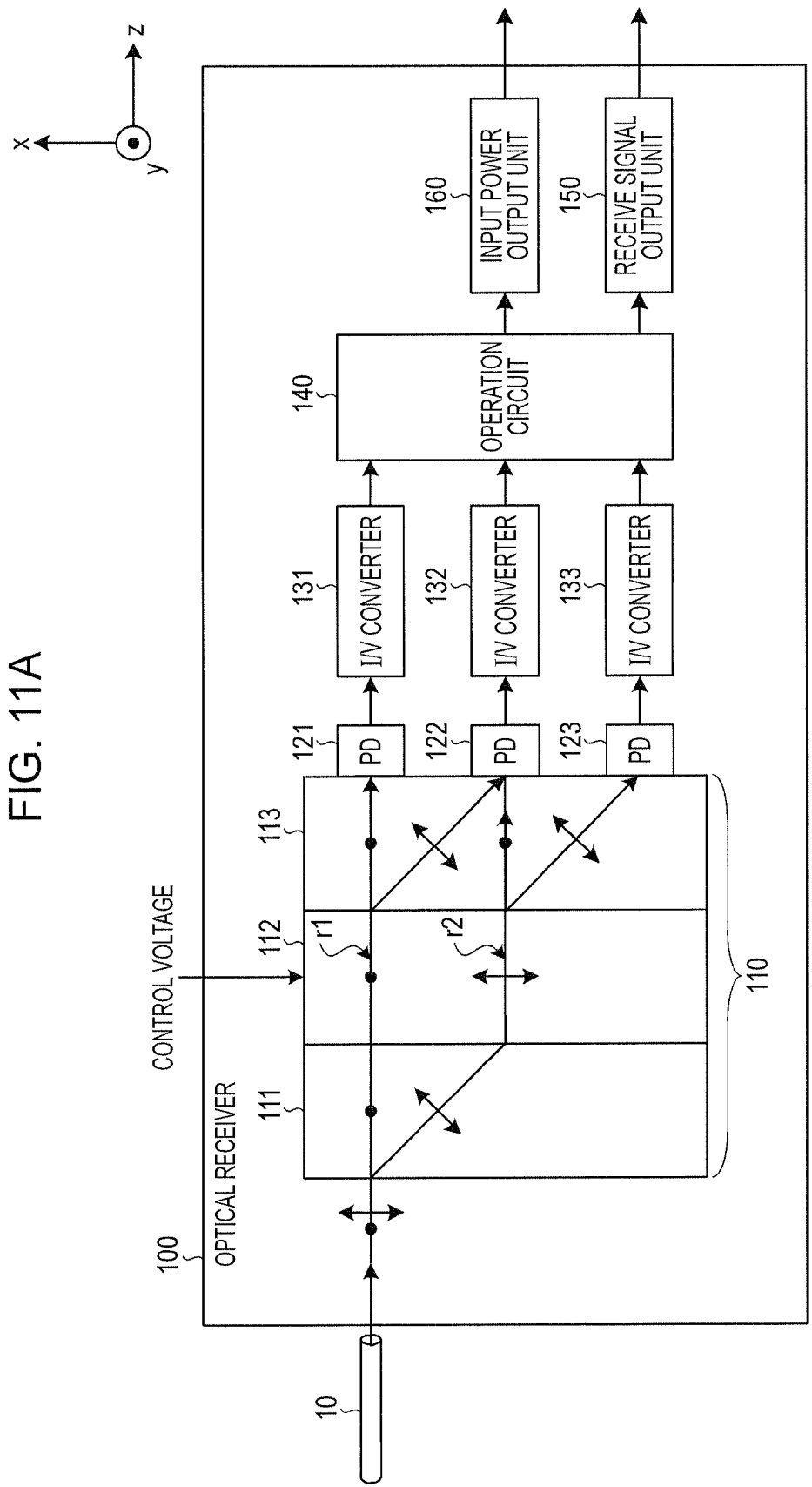
FIG. 11A illustrates a fourth configuration example of an optical receiver.

FIG. 11A illustrates a fourth configuration example of a optical receiver. In FIG. 11A, like numbers refer to like components to those illustrated in FIG. 1A, and the description will be omitted. As illustrated in FIG. 11A, the variable phase plate 112 may give a phase difference according to the control voltage input from an external device to the optical receiver 100 to between polarized components. In this case, the control voltage generator 170 (as in FIG. 1A) may be omitted.

Figure 11B:
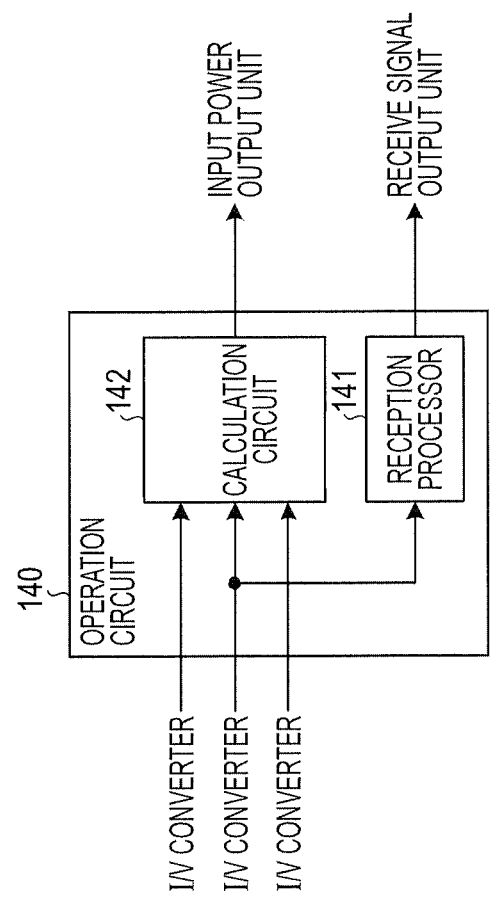
FIG. 11B illustrates a third configuration example of an operation circuit.

FIG. 11B illustrates a third configuration example of the operation circuit. In FIG. 11B, like numbers refer to like components to those illustrated in FIG. 1B, and the description will be omitted. As illustrated in FIG. 11B, the operation circuit 140 illustrated in FIG. 11A may not have the amount-of-attenuation controller 143. As illustrated in FIG. 11A and FIG. 11B, the optical receiver 100 may control the amount of attenuation on a main signal on the basis of externally input control voltage instead of performing feedback control with the power of the main signal received by the PD 122.

Fifth Embodiment

Figure 12A:
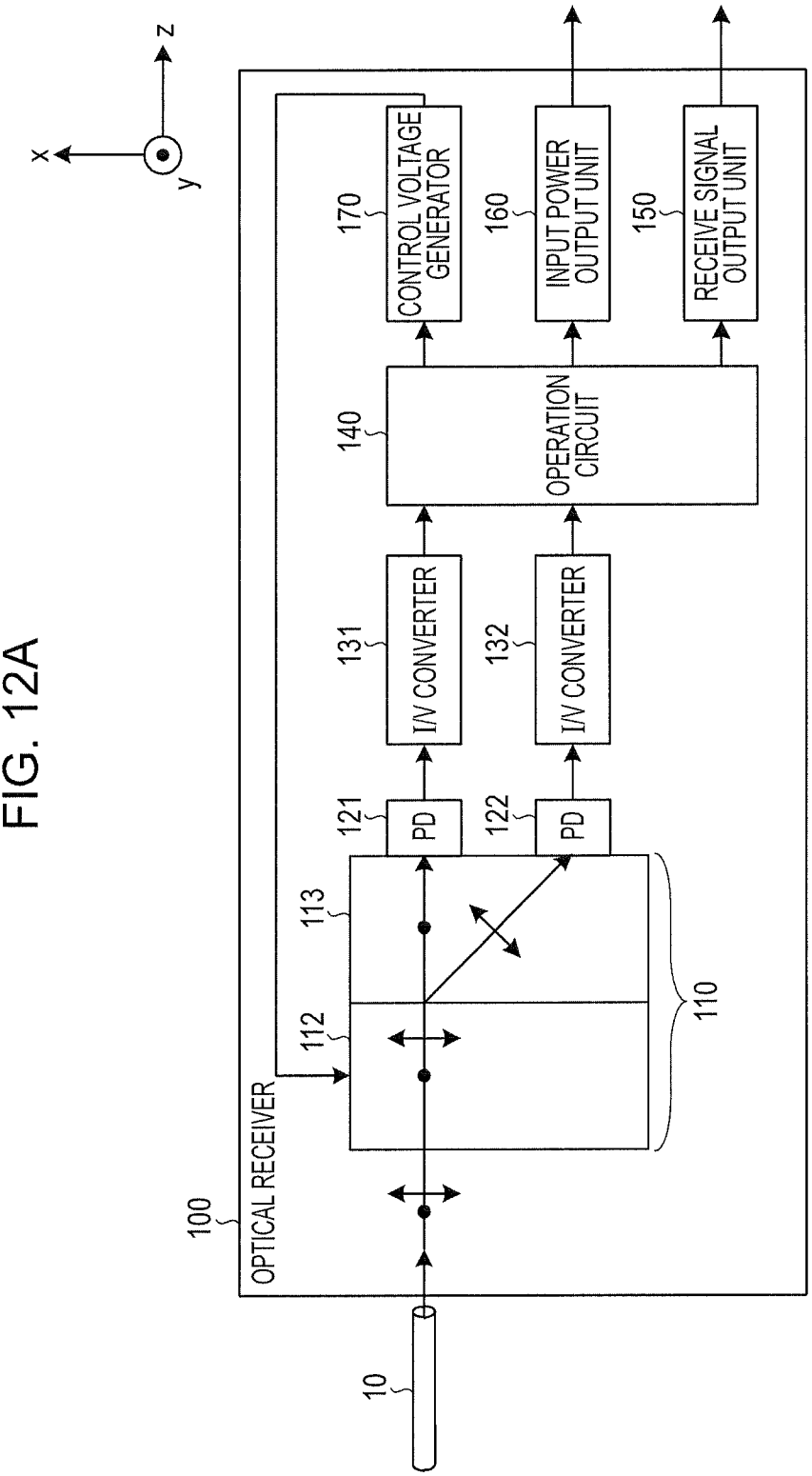
FIG. 12A illustrates a fifth configuration example of an optical receiver.

FIG. 12A illustrates a fifth configuration example of a optical receiver. In FIG. 12A, like numbers refer to like components to those illustrated in FIG. 1A, and the description will be omitted. As illustrated in FIG. 12A, the variable-ratio splitter 110 may not have the polarizer 111, PD 123 and I/V converter 133.

Even without the polarizer 111, when the direction of polarization of signal light input from the optical fiber 10 to the optical receiver 100 is constant and is known, for example, the direction of polarization of the signal can be changed by correctly selecting the optical axial direction of the variable phase plate 112. This allows splitting signal light by the ratio according to the control voltage to be applied to the variable phase plate 112 and causes the split signal light beams to be received by the corresponding PD 121 and 122.

Figure 12B:
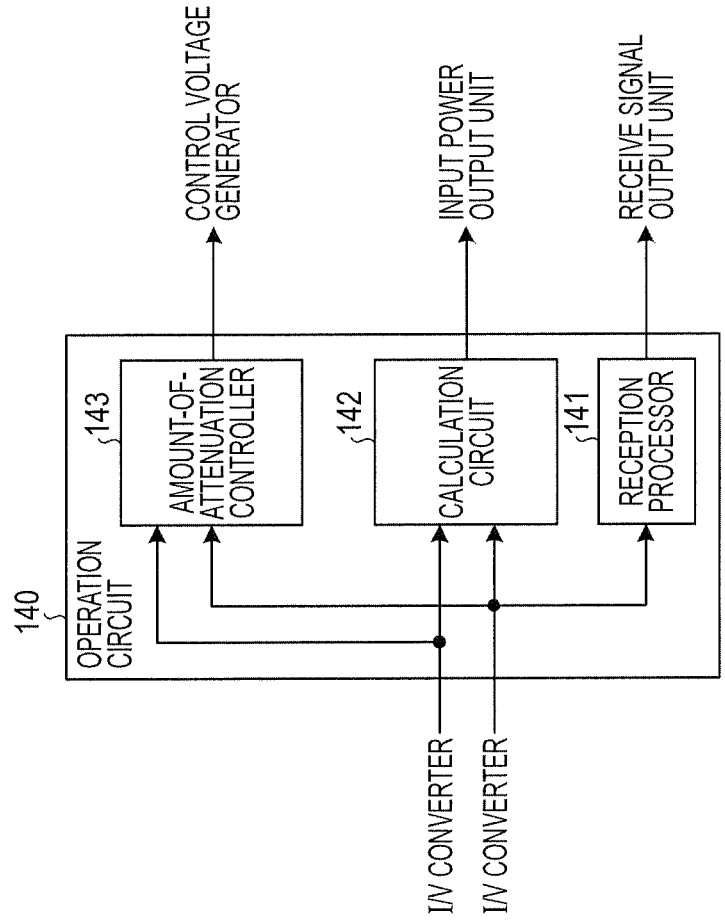
FIG. 12B illustrates a fifth configuration example of an operation circuit.

FIG. 12B illustrates a fifth configuration example of the operation circuit. In FIG. 12B, like numbers refer to like components to those illustrated in FIG. 1B, and the description will be omitted. As illustrated in FIG. 12B, in the operation circuit 140 illustrated in FIG. 12A, the calculation circuit 142 calculates the total power of signals output from the I/V converters 131 and 132. The total power of signal light output from the I/V converters 131 and 132 exhibits the power (input power) before the attenuation by the variable-ratio splitter 110 of the signal light input from the optical fiber 10 to the optical receiver 100. The amount-of-attenuation controller 143 controls the amount of attenuation on a main signal received by the PD 122 on the basis of at least one of the signals output from the I/V converters 131 and 132.

Sixth Embodiment

Figure 13:
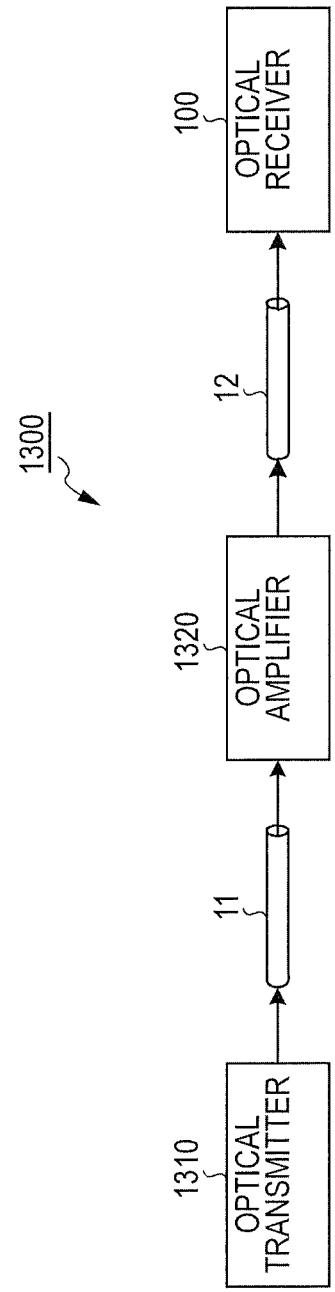
FIG. 13 illustrates a configuration example of a communication system applying an optical receiver.

FIG. 13 illustrates a configuration example of a communication system applying the optical receiver. As illustrated in FIG. 13, a communication system 1300 includes an optical transmitter 1310, an optical amplifier 1320, a optical receiver 100, and optical fibers 11 and 12. The optical transmitter 1310 transmits signal light through the optical fiber 11 to the optical amplifier 1320.

The optical amplifier 1320 amplifies the signal light transmitted from the optical transmitter 1310. The optical amplifier 1320 transmits the amplified signal light through the optical fiber 12 to the optical receiver 100. The optical receiver 100 receives the signal light transmitted from the optical amplifier 1320. The optical receiver 100 may be any one of the aforementioned optical receivers 100.

Since the optical receiver 100 attenuates the signal light and performs the reception processing of the attenuated signal light, the deterioration of characteristic of the received signal light can be prevented even without an optical attenuator on the optical fiber 12, which can reduce the equipment costs. The dynamic range of power of signal light can be increased because the optical receiver 100 attenuates the signal light and performs the reception processing of the attenuated signal light. Thus, the margin for the system design of the communication system 1300 may be increased.

Others

In this way, in the optical receiver 100 of embodiments described above, signal light is split by a variable ratio, and the split signal light beams are received. Thus, the power of the received signal light can be attenuated by a variable amount of attenuation. This allows prevention of deterioration of the received signal characteristic even when signal light having large power is input to the optical receiver 100.

In the optical receiver 100, even when the amount of attenuation on the received signal light is changed, the total power of the received signal light is calculated so as to monitor the input power of the signal light before the attenuation. Even when light transmission characteristic of the polarizer 111, variable phase plate 112 or polarizer 113 changes depending on the wavelength of signal light or temperature, the relationship that the total power of the split and received signal light are equal to the input power is typically satisfied. Therefore, with the optical receiver 100, even when the wavelength of signal light or temperature changes, the input power can be monitored with high precision.

Furthermore, even without creating a look-up table illustrating input power for each wavelength of signal light or temperature, for example, the input power may be monitored with high precision. Thus, the input power monitoring may be implemented at low costs, and the manufacturing costs for the optical receiving module can be minimized.

Furthermore, the signal light loss due to unconditional splitting of a part of signal light does not occur, compared with the technology that partially splits and monitors signal light with an optical splitter before the variable optical attenuator, for example. Thus, even when the signal light has small input power, the deterioration of the minimum receiving sensitivity can be prevented.

The optical receiver 100 has been described in which the signal light received by the PD 122 undergoes reception processing by the reception processor 141 as a main signal. However, the signal light received by the PD 121 or PD 123 may undergo reception processing by the reception processor 141 as a main signal.

As described above, the optical receiver and communication system allows monitoring input power with high precision.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical receiver comprising:
   a variable-ratio splitter to split an input signal light into a plurality of signal lights, based on a variable ratio;
   a plurality of photo detectors to receive the plurality of signal lights respectively;
   an operation circuit to output a reception electrical signal, based on a reception processing on one of the plurality of signal lights;
   a calculation circuit to calculate a total power based on the plurality of signal lights received by each of the plurality of photo detectors; and
   an output unit to output a signal regarding the total power.

2. The optical receiver according to claim 1, wherein the variable-ratio splitter includes:
   a polarization adjusting plate to adjust the ratio of polarized components included in the input signal light; and
   a first polarizer to split the input signal light processed by the polarization adjusting plate into a first plurality of signal lights including each polarized component.

3. The optical receiver according to claim 1, wherein:
   a predetermined photo detector of the plurality of photo detectors receives all of the plurality of signal lights from the variable-ratio splitter; and
   the operation circuit performs the reception processing on the signal light from the predetermined photo detector.

4. The optical receiver according to claim 1, wherein one or more of the plurality of photo detectors receives one or more of the plurality of signal lights respectively, the one or more of the plurality of signal lights differing from the signal light on which the reception processing is performed by the operation circuit.

5. The optical receiver according to claim 2, wherein:
   the variable-ratio splitter further includes a second polarizer to split the input signal light into a second plurality of signal lights including each polarized component; and
   the polarization adjusting plate adjusts the ratio of polarized components included in the second plurality of signal lights.

6. The optical receiver according to claim 2, further comprising:
   a controller to generate a control voltage for the polarization adjusting plate, based on one or more of the first plurality of signal lights received by the plurality of photo detectors,
   wherein the polarization adjusting plate adjusts the ratio of polarized components included in the input signal light in accordance with the control voltage.

7. The optical receiver according to claim 2, wherein the polarization adjusting plate includes a variable phase plate that causes a phase difference between polarized components of the input signal light to be variable.

8. The optical receiver according to claim 2, wherein the first polarizer includes a double refraction plate.

9. The optical receiver according to claim 2, wherein the first polarizer includes a polarization beam splitter.

10. The optical receiver according to claim 5, further comprising:
    a controller to generate a control voltage for the polarization adjusting plate, based on one or more of the first plurality of signal lights received by the plurality of photo detectors,
    wherein the polarization adjusting plate adjusts the ratio of polarized components included in the second plurality of signal lights in accordance with the control voltage.

11. The optical receiver according to claim 6, wherein the controller generates the control voltage based on one of control for attenuating the signal light on which the reception processing is performed and control for minimizing an amount of attenuation of the signal light on which the reception processing is performed, based on the total power calculated by the calculation circuit.

12. The optical receiver according to claim 7, wherein the variable phase plate is implemented by an element having an electro-optical effect by which an index of refraction is changed in accordance with an applied voltage.

13. The optical receiver according to claim 7, wherein the variable phase plate is implemented by an element having a magneto-optical effect by which an index of refraction is changed in accordance with an applied intensity of a magnetic field.

14. The optical receiver according to claim 10, wherein the controller generates the control voltage based on one of control for attenuating the signal light on which the reception processing is performed and control for minimizing an amount of attenuation of the signal light on which the reception processing is performed, based on the total power of the signal light calculated by the calculation circuit.

15. A communication system comprising:
    an optical receiver including:
       a variable-ratio splitter to split an input signal light into a plurality of signal lights, based on a variable ratio;
       a plurality of photo detectors to receive the plurality of signal lights respectively; an operation circuit to output a reception electrical signal, base on a reception processing on one of the plurality of signal lights;
       a calculation circuit to calculate a total power based on the plurality of signal lights received by each of the plurality of photo detectors; and
       an output unit to output a signal regarding the total power;
    an optical transmitter to transmit a plurality of signal lights; and
    an optical fiber through which the optical transmitter transmits the plurality of optical lights to the optical receiver.

16. An optical receiver comprising:
    a variable-ratio splitter to split an input signal light into a plurality of signal lights, based on a variable ratio;
    a plurality of photo detectors to receive the plurality of signal lights respectively;

an operation circuit to output a reception electrical signal, based on a reception processing on one of the plurality of signal lights;

a calculation circuit to calculate a total power of the plurality of signal lights received by the plurality of photo detectors; and an output unit to output a signal regarding the total power, wherein the variable-ratio splitter includes:

a polarization adjusting plate to adjust the ratio of polarized components included in the input signal light; and a first polarizer to split the input signal light processed by the polarization adjusting plate into a first plurality of signal lights including each polarized component.

17. An optical receiver comprising:

a variable-ratio splitter to split an input signal light into a plurality of signal lights, based on a variable ratio;

a plurality of photo detectors to receive the plurality of signal lights respectively;

an operation circuit to output a reception electrical signal, based on a reception processing on one of the plurality of signal lights;

a calculation circuit to calculate a total power of the plurality of signal lights received by the plurality of photo detectors; and an output unit to output a signal regarding the total power, wherein a predetermined photo detector of the plurality of photo detectors receives all of the plurality of signal lights from the variable-ratio splitter; and wherein the operation circuit performs the reception processing on the signal light from the predetermined photo detector.

* * * * *